United States Patent Office 3,759,881
Patented Sept. 18, 1973

3,759,881
POLYACRYLATE CASTING PROCESS
Charles B. Holder, Wappingers Falls, N.Y., assignor to
Texaco Inc., New York, N.Y.
No Drawing. Filed Dec. 14, 1970, Ser. No. 98,174
Int. Cl. C08f 3/64, 3/66, 15/16
U.S. Cl. 260—86.1 E          14 Claims

ABSTRACT OF THE DISCLOSURE

Polyacrylate castings are prepared by first forming a viscous prepolymer by intimately admixing an acrylic acid ester with an amine initiator, such as morpholine, and then, in a second step, completing the polymerization in a mold thus forming a clear polyacrylate casting.

FIELD OF THE INVENTION

This invention relates to a process for the bulk polymerization of acrylic acid esters employing certain amines as initiators. More particularly, this invention relates to a casting process in which clear castings are prepared from acrylic acid esters utilizing amines, such as morpholine, as an initiator.

DESCRIPTION OF THE PRIOR ART

The art is replete with examples of processes for the polymerization of acrylic acid esters. Bulk, solution, suspensions or emulsion polymerization systems with free radical type catalysts, for example peroxides, persulfates, azo initiators, etc. have been proposed. However, all of these prior art processes suffer from one or more serious disadvantages.

Compounds which contain directly-linked oxygen atoms, such as hydrogen peroxide, benzoyl peroxide, lauroyl peroxide, potassium persulfate and other peroxides, are widely used as catalysts or initiators in polymerizing methacrylic acid esters. The use of such compounds gives rise to a number of problems, e.g., they may oxidize the polymers as formed, thus yielding discolored products or they may alter the color of dyestuffs added during polymerization. Many of these compounds are shock sensitive and/or thermally unstable and frequently the peroxy catalysts contain oxidizing residues which prevent direct use of the resulting polymers for some applications. Other catalysts previously utilized sometimes leave decomposition fragments which contribute to degradation of the formed polymers.

In preparing cast polyacrylate materials such as sheet, rod, etc., one of the major problems facing the industry has been that of bubble formation and prior to this invention it has been extremely difficult to obtain thick specimens which are clear without special pressure vessels.

One of the primary objects of this invention is to provide a convenient process for preparing clear, polyacrylate castings.

Another object of this invention is to provide a process for preparing clear polyacrylate castings which are substantially bubble-free.

Another object of this invention is to provide a casting process for acrylic acid esters employing a relatively inexpensive amine catalyst.

SUMMARY OF THE INVENTION

It has been found that clear, polyacrylate castings such as rod, plate, etc. con be conveniently prepared in a process which comprises: (1) intimately admixing in a reaction vessel a monomer of the formula:

$$\text{CH}_2\!=\!\overset{\text{R}_a}{\underset{}{\text{CH}}}\!-\!\text{COOR}$$

wherein R is alkyl of from 1 to 4 carbon atoms and $R_a$ is selected from the group consisting of hydrogen and alkyl of from 1 to 3 inclusive carbon atoms, with an initiator selected from the group consisting of piperidine, morpholine, piperazine, alkyl-substituted piperidines, alkyl-substituted morpholines, alkyl-substituted piperazines and dialkanolamines, and wherein the alkyl substituents of the said piperidines, morpholines and piperazines are attached to ring carbon atoms, for a period of time and at a temperature sufficient to partially polymerize the said monomer thus forming a viscous prepolymer and (2) substantially completing the polymerization reaction in the said reaction vessel or other suitable mold heated to polymerization temperature and under quiescent condition to yield a clear, polyacrylate casting.

Both polymerization steps in this process can be conducted in the same vessel in which case the vessel also acts as a mold in determining the shape of the cast product. Usually, however, in large scale production, the prepolymer is prepared in a typical agitator-equipped resin kettle and is thereafter transferred to a second vessel or mold in which the formation of the solid product is accomplished.

The cast polymer specimens formed by the process of this invention can contain one or more of the various conventional additives such as lubricants, plasticizers and modifying agents.

DETAILED DESCRIPTION OF THE INVENTION

Initiators especially useful in practicing the novel casting process of this invention include amine compounds of the formula:

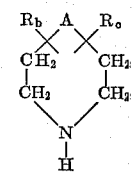

wherein $R_b$ and $R_c$ are selected from the group consisting of hydrogen and alkyl of from 1 to 5 inclusive carbon atoms, wherein $R_b$ and $R_c$ are attached to different ring carbon atoms, and A is selected from the group consisting of $CH_2$, O, and NH; and dialkanolamines of the formula:

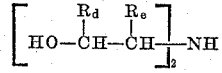

wherein $R_d$ and $R_e$ are independently selected from the group consisting of hydrogen and alkyl of from 1 to 3 inclusive carbon atoms. Mixtures of these amines may be utilized, if desired. Examples of amines of the above-mentioned types which are suitable for use as initiators in the casting process of this invention include piperidine, 2-methylpiperidine, 4-ethylpiperidine, 3-isopropylpiperidine, 5 - ethyl-2-methylpiperidine, 3,5-di-pentylpiperidine, morpholine, 2-ethylmorpholine, 3-n-propylmorpholine, 2-isopropylmorpholine, 2,6 - di-n-butylmorpholine, 2-isobutyl morpholine, 3-pentylmorpholine, piperazine, 2-ethylpiperazine, 3 - isopropylpiperazine, diethanolamine, di(2-hydroxypropyl)amine, di(2 - hydroxybutyl)amine, di(2-hydroxy-3-methylbutyl)amine, di(1-methyl-2-hydroxyethyl), di(1 - ethyl-2-hydroxypropyl)amine, di(1-isopropyl-2-hydroxyethyl)amine, etc.

Morpholine compounds useful in practicing the process of this invention can be prepared by the method described in Campbell, U.S. Pat. 2,034,427 by reacting, for example, dichloroethyl ether or an alkyl-substituted dichloroethyl ether dissolved in benzene with anhydrous ammonia at pressures of about 1750 p.s.i.g. Likewise, piperidine and piperidine derivatives of the type set forth above can be synthesized by the hydrogenation of pyridine or substituted-pyridines over Raney nickel at about 200° C., as described by Acheson, R. M.; An Introduction to the Chemistry of Heterocyclic Compounds, Second Edition, Interscience Publishers, New York, 1967, page 201. Piperazine and piperazine derivatives useful in this invention can be prepared by reacting the appropriate aliphatic diamine with ethylene oxide followed by vapor phase dehydration and ring closure as set forth by Acheson, R. M., ibid., page 347.

Although only a catalytic quantity of the initiator is required to effect polymerization of the acrylic acid esters by the process of this invention, generally from about 0.1 to about 10 volume percent based on the volume of the acrylic acid ester or esters charged to the polymerization reactor is employed, and, preferably, about 0.1 to about 5 volume percent on the same basis, is utilized.

In a like manner, the polymerization temperature can be varied over a wide range depending on the particular monomer being polymerized, the initiator employed, etc. Usually, in the first stage of the process, i.e., the preparation of the initial viscous prepolymer, the temperature will be from about 10° C. up to about 100° C. and, preferably, will be from about 40° C. to about 80° C. The final polymerization stage of this process, i.e., the step in which the initial viscous prepolymer is transformed into a solid casting, is usually carried out at temperatures ranging from about 30° C. to about 140° C., and, preferably, at about 40° C. to about 100° C.

Acrylic acid ester monomers suitable for polymerization by the novel casting process of this invention include, for example, methyl acrylate, methyl methacrylate, methyl $\alpha$-propylacrylate, ethyl methacrylate, ethyl $\alpha$-ethylacrylate, propyl methacrylate, isopropyl acrylate, butyl methacrylate, and mixtures and isomers thereof. If desired, up to about 10 percent by volume of a higher acrylic acid ester, such as isohexyl acrylate, octyl methacrylate, decyl methacrylate, decyl acrylate, lauryl methacrylate, lauryl acrylate, lauryl $\alpha$-propylacrylate, myristyl methacrylate cetyl methacrylate, or stearyl methacrylate may be present in the monomer charge.

The higher alkyl acrylates can be conveniently prepared from the corresponding methyl acrylate by alcoholysis. Usually, the reaction is conducted with an excess of the alcohol and a small amount of a mineral acid, such as sulfuric acid, as described in Textbook of Polymer Science, Billmeyer, F. W., Interscience Publishers, New York, 1966, page 403.

Since the polymerization of acrylates is drastically inhibited by oxygen, the method of this invention is preferably carried out in an inert atmosphere which can be, for example, nitrogen, argon, etc., although for reasons of economy, nitrogen is the usual gas employed.

Other materials such as carbon tetrachloride, dimethylformamide, as well as plasticizers, such as dibutuyl phthalate, ultra-violet absorbers, pigments and dyes, chain transfer agents including alkyl mercaptans, such as dodecyl mercaptan, aromatic disulfides, such as dixylyl disulfide, and other halogen compounds, to modify the polymerization reaction or the properties of the final products may be added to the polymerization mixture, if desired. If utilized, generally from about 0.01 to 5.0 volume percent of the modifier based on the volume of the acrylic acid ester is incorporated in the charge.

Molecular weights of the cast polymers prepared by this invention will vary widely depending on the particular initiator utilized, the initiator concentraton, the prepolymer polymerization temperature and final polymerization temperature employed, and on other operating variables; however, generally the molecular weights of the cast polyacrylate specimens will range from about 50,000 to about 5,000,000 or more.

Utilizing the novel casting process of this invention it is found that castings having a thickness of 0.5 inch and more can be prepared which are hard, clear and essentially bubble-free materials whereas castings prepared with art-accepted initiators, such as azoisobutylronitrile or lauroyl peroxide at the same temperature resemble coarse foams.

The cast polyacrylate materials formed using the process of this invention can be used in signs, skylights, for glazing and decorative purposes in the building industry.

The following examples illustrate various embodiments of this invention and are to be considered not limitative.

EXAMPLES I–IX

Polymerization bottles, i.e. 8 oz. screw-cap bottles, provided with liners of sheet Teflon over rubber subliners, were purged with pre-purified nitrogen and temporarily sealed. The charge materials which included the inhibitor-free monomer, initiator and modifier, if any, pre-purged with pre-purified nitrogen were then pipetted into the polymerization bottles. After the remaining air was swept out of the void space with pre-purified nitrogen the bottles were tumbled in a rotating rack held in a 65° C. constant temperature bath to prepare the viscous prepolymer. The completion of the polymerization reaction was conducted in the same bottle standing upright, undisturbed, i.e. under quiescent conditions, in a circulating air oven.

At the conclusion of the run the sample was cooled, following which the bottle was broken to permit removal of the intact casting. Samples were taken from each casting for determination of polymer yield and properties including the measurement of the molecular weight by membrane osmometer. Pertinent details relating to these examples are set forth in Table 1.

The castings made with azobisisobutyronitrile and lauroyl peroside (Examples VIII and IX of Table 1) resembled coarse foam and are completely unsatisfactory for uses where clear specimens are required. In contrast, the hard castings prepared using morpholine were substantially bubble-free and when prepared without carbon tetrachloride being present in the reaction mixture, they were colorless as well.

TABLE 1.—EXPERIMENTAL DETAILS ON PREPARATION OF CASTINGS [1]

| Example | MMA, ml.[2] | CCl, ml.[3] | Initiator Type[4] | Initiator Percent[5] | Prepolymer preparation °C. | Prepolymer preparation Hrs. | Casting conditions Where | Casting conditions Hr./65° C. | Casting conditions H./140° C. | Percent conversion | Molecular wt. Mn ×10⁻⁶ | Comments |
|---|---|---|---|---|---|---|---|---|---|---|---|---|
| I | 50 | 0 | M | 0.8 | 65 | 5 | Oven | 120 | 0 | 89.4 | >3 | Colorless, clear, 1 bubble (small). |
| II | 50 | 0 | M | 0.8 | 65 | 5 | ...do... | 24 | 0 | 80.0 | >1 | Colorless, clear, 3 bubbles (small). |
| III | 50 | 5 | M | 0.8 | 65 | 5 | ...do... | 120 | 0 | 99.0 | 1.2 | Sl. yellowing, clear, 10 bubbles (small). |
| IV | 50 | 5 | M | 0.8 | 65 | 5 | ...do... | 24 | 0 | 101.5 | 2.6 | Colorless, clear, 10 bubbles (small). |
| V | 75 | 0 | M | 0.8 | 65 | 5 | ...do... | 40 | 0 | 88.0 | 0.96 | Colorless, clear, 1 bubble (small). |
| VI | 75 | 5 | M | 0.8 | 65 | 5 | ...do... | 40 | 8 | 88.0 | 1.2 | Yellow, clear, no bubbles. |
| VII | 75 | 5 | M | 0.8 | 65 | 5 | ...do... | 40 | 0 | 87.7 | 0.79 | Colorless of very sl. yellowing, clear 10–15 bubbles (medium). |
| VIII | 75 | 0 | 4 | 0.02 | 65 | 0.8 | Bath, oven. | 17–51 | 20 | 98.2 | 1.2 | Full of bubbles formed during 17 hrs. in bath. |
| IX | 75 | 0 | 5 | 0.02 | 65 | 1 | ...do... | 17–51 | 20 | 98.4 | >2 | 20–30 large bubbles formed during 17 hrs. in bath. |

[1] Prepolymers were made in the tumbling rack. Castings were made quiescent in bath or oven as indicated. After Example IV, prepolymers were vacuum de-gassed before castings were made.
[2] Castings were about 2¼ in. diameter; 50 ml. gave about ¾ in. height, 75 ml. about 1 in., MMA-methyl methacrylate.
[3] Azobisisobutyronitrile.
[4] Lauroyl peroxide.
[5] Percent by volume based on volume of monomer.

EXAMPLES X-XIII

Castings with sufficient length for mechanical testing were prepared in these examples using methyl methacrylate as the monomer. The castings were made in 25 mm. by 200 mm. glass "culture tubes" with screw caps containing Teflon liners over rubber sub-liners. The tubes were filled to approximately 80% of capacity and then tumbled in a rotating rack in a water bath to form a prepolymer, followed by completion of the polymerization with the tubes stationary in a horizontal position. For polymerizations using azo or peroxy initiators, prepolymer formation and the early part of the stationary phase were performed at 50° C. in an effort to eliminate bubble formation. After completion of the polymerization cycle, the glass tubes were broken and the castings, all essentially bubble-free, were removed and sawed up for testing an analysis. Data relating to these examples are set forth in Table 2 which follows:

TABLE 2.—PREPARATION OF LONG CASTINGS FOR MECHANICAL TESTING [a]

| | Example | | | |
|---|---|---|---|---|
| | X | XI | XII | XIII |
| Initiator | (b) | (b) | (c) | (d) |
| Bath temperature, ° C. | 65 | 65 | 50 | 50 |
| Hours in bath, tumbling | 7 | 6 | 3.5 | 3.5 |
| Hours in bath, stationary | 0 | 0 | 2.5 | 2.5 |
| Hours in 50° C. oven | 0 | 0 | 17.5 | 17.5 |
| Hours in 65° C. oven | 64.5 | 64.5 | 70 | 70 |
| Hours in 140° C. oven | 7.5 | 7.5 | 7.5 | 7.5 |
| Heat deflect temperature, ° C. (0.01 in deflect, ⅛ in. bar) | 94.1 | 93.1 | 106 | 104.5 |
| Izod impact, (ft. lb./in. notch) | 0.33 | 0.32 | 0.26 | 0.26 |
| Molecular weight ×10⁻⁵ | 3.56 | | 1.39 | 0.89 |

[a] Only methyl methacrylate and initiator were charged. Conversion figures were not obtained.
[b] Morpholine, 0.8 ml./100 ml.
[c] Azobisisobutyronitrile, 0.02 g./100 ml.
[d] Lauroyl peroxide, 0.02 g./100 ml.

The results tabulated in Table 2 above show that the physical properties of the clear, hard colorless castings prepared using morpholine as an initiator are substantially equal to those of castings formed with the art-employed initiators, i.e., azobisisobutyronitrile and lauroyl peroxide.

What is claimed is:

1. A process for forming a polyacrylate casting which comprises: (1) intimately admixing in a reacting vessel a monomer of the formula:

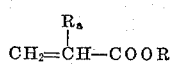

wherein R is alkyl of from 1 to 4 carbon atoms and $R_a$ is selected from the group consisting of hydrogen and alkyl of from 1 to 3 inclusive carbon atoms, with an initiator selected from the group consisting of piperidine, morpholine, piperazine, alkyl-substituted morpholines, alkyl-substituted piperazines wherein the said alkyl substituents are attached to ring carbon atoms and have from 1 to 5 carbon atoms; for a period of time and at a sufficient temperature under conditions of agitation to partially polymerize the said monomer thus forming a viscous prepolymer, (2) substantially completing the polymerization reaction in said reaction vessel heated to polymerization temperature and under quiescent conditions thus forming a clear polyacrylate casting, and wherein the said initiator in step 1 is present in an amount of from about 0.1 to about 10 volume percent based on the volume of the monomer.

2. The process of claim 1 wherein the polymerization of the monomer in step 1 is conducted at a temperature of from about 10° to about 100° C. and the polymerization in step 2 is conducted at a temperature of from about 30° to about 140° C.

3. The process of claim 1 wherein the said monomer is methyl methacrylate.

4. The process of claim 1 wherein the said monomer is ethyl methacrylate.

5. The process of claim 1 wherein the said monomer is a mixture of alkyl methacrylates.

6. The process of claim 1 wherein the said initiator is morpholine.

7. The process of claim 1 wherein the said initiator is piperidine.

8. The process of claim 1 wherein the said monomer is methyl methacrylate, the said initiator is morpholine which is present in an amount of from about 0.1 to about 5 volume percent based on the volume of the monomer; the polymerization temperature in step 1 is about 10° to about 100° C. and the polymerization in step 2 is about 30° to 140° C.

9. The process of claim 1 wherein the said monomer is ethyl methacrylate, the said initiator is morpholine which is present in an amount of from about 0.1 to about 5 volume percent based on the volume of the monomer; the polymerization temperature in step 1 is about 10° to about 100° C., and the polymerization temperature in step 2 is about 30° to 140° C.

10. The process of claim 1 wherein the molecular weight of polymethacrylate in the said casting formed in step 2 is about 50,000 to about 5,000,000, as determined by membrane osmometer.

11. The process of claim 1 wherein the said polymerization steps are conducted under an atmosphere of an inert gas.

12. The method of claim 1 wherein the said prepolymer is withdrawn from the first reaction vessel and introduced into a mold following which the said polymerization is substantially completed in the said mold heated to polymerization temperature and under quiescent conditions thus forming a clear, polyacrylate casting.

13. The process of claim 1 wherein the said initiator is a compound of the formula:

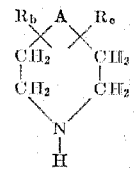

wherein $R_b$ and $R_c$ are selected from the group consisting of hydrogen and alkyl of from 1 to 5 carbon atoms, wherein $R_b$ and $R_c$ are each attached to a different ring carbon atom and wherein A is selected from the group consisting of $CH_2$, O, and NH.

14. The process of claim 1 wherein the said initiator is selected from the group consisting of piperidine, morpholine and piperazine.

References Cited
UNITED STATES PATENTS

| | | | |
|---|---|---|---|
| 2,529,315 | 11/1950 | Serniuk | 260—84.7 |
| 2,557,363 | 6/1951 | Serniuk | 260—84.3 |
| 2,647,878 | 8/1953 | Lee | 260—85.5 N |
| 2,558,139 | 6/1951 | Knock et al. | 260—89.5 A |
| 3,222,334 | 12/1965 | Demme | 260—89.5 A |

HARRY WONG, Jr., Primary Examiner

U.S. Cl. X.R.

260—31.8 R, 32.6 R, 33.8 UA, 89.5 A, DIG 43

UNITED STATES PATENT OFFICE
CERTIFICATE OF CORRECTION

Patent No. 3,759,881   Dated September 18, 1973

Inventor(s) CHARLES B. HOLDER

It is certified that error appears in the above-identified patent and that said Letters Patent are hereby corrected as shown below:

Column 1, line 65, "con" should read -- can -- . Column 4, line 7, "concentraton" should read -- concentration --. Table 1, columns 3 and 4, Example VII under the heading "Comments", the word "of" should read -- or -- . Table 2, column 5, Hours in 65°C. oven, Under Example XI, "64 5" should read -- 64.5 -- . Column 5, lines 41 and 42, "luaroyl" should read -- lauroyl -- .

Signed and sealed this 22nd day of January 1974.

(SEAL)
Attest:

EDWARD M. FLETCHER, JR.        RENE D. TEGTMEYER
Attesting Officer              Acting Commissioner of Patents